United States Patent [19]
Kim

[11] Patent Number: 5,859,758
[45] Date of Patent: Jan. 12, 1999

[54] ELECTRO-STATIC DISCHARGE PROTECTION CIRCUIT

[75] Inventor: Dae Seong Kim, Kyungsangbuk-do, Rep. of Korea

[73] Assignee: LG Semicon Co., Ltd., Chungcheongbuk-Do, Rep. of Korea

[21] Appl. No.: 863,203

[22] Filed: May 27, 1997

[30] Foreign Application Priority Data

Nov. 20, 1996 [KR] Rep. of Korea .................. 1996 55668

[51] Int. Cl.[6] ..................................................... H02H 9/00
[52] U.S. Cl. ............................... 361/111; 361/56; 361/91
[58] Field of Search .................... 361/18, 56, 58, 361/91, 111, 113, 115, 118, 119, 127

[56] References Cited

U.S. PATENT DOCUMENTS

| | | | |
|---|---|---|---|
| 4,254,442 | 3/1981 | Dijkmans et al. | 361/56 |
| 4,571,656 | 2/1986 | Ruckman | 361/56 |
| 5,412,527 | 5/1995 | Husher | 361/56 |

*Primary Examiner*—Richard T. Elms
*Assistant Examiner*—Stephen Jackson
*Attorney, Agent, or Firm*—Morgan, Lewis & Bockius LLP

[57] ABSTRACT

An electro-static discharge (ESD) protection circuit for a semiconductor device includes a primary ESD protection circuit including at least two diodes, the primary ESD protection circuit being located between a positive voltage and a negative voltage, and connected to input/output terminals of the semiconductor device, the primary ESD protection circuit bypassing any static electricity applied from the input/output terminals; and a secondary ESD protection circuit connected to the primary ESD protection circuit in parallel, the secondary ESD protection circuit including at least two diodes.

18 Claims, 4 Drawing Sheets

ELECTRO-STATIC DISCHARGE PROTECTION CIRCUIT

This application claims the benefit of Korean Application No. 55668/1996, filed Nov. 20, 1996, which is hereby incorporated by reference.

BACKGROUND OF THE INVENTION

1. Field of the Invention

The present invention relates to a circuit, and more particularly, to an electrostatic discharge (ESD) protection circuit.

2. Discussion of the Related Art

A conventional ESD protection circuit will be explained below with reference to the accompanying drawings. FIG. 1A shows an ESD protection circuit located inside a conventional device, i.e., a conventional internal ESD protection circuit. FIG. 1B shows an ESD protection circuit located outside of a conventional device, i.e., a conventional external ESD protection circuit. The conventional ESD protection circuits perform the function of preventing the associated device from being destroyed due to internal or external static electricity.

Referring to FIG. 1A, the internal ESD protection circuit is formed as a first part, i.e., at a first stage, of an internal circuit of a device. The ESD protection circuit includes a first diode 1 and a second diode 2. The anode of the first diode 1 is connected to a positive (+) power voltage (Vdd) and its cathode is connected to input/output ports (or pad) of the internal circuit. The anode of the second diode 2 is connected to the input/output ports of the internal circuit to which the cathode of the first diode 1 is connected, and the cathode of the second to diode 2 is connected to a negative (−) power voltage Vss.

The first diode 1 protects the internal circuit from positive static electricity, and the second diode 2 protects the internal circuit from negative static electricity. The first and second diodes 1 and 2 are PN junction diodes. It is also possible to use transistors instead of the diodes.

The external ESD protection circuit shown in FIG. 1B has essentially the same structure as the external ESD protection circuit shown in FIG. 1A. The only difference is that the external ESD protection circuit in FIG. 1B is located outside the device. Similarly, the first and second diodes 1 and 2 are PN junction diodes. Again, it is possible to use transistors instead of the diodes in the external ESD protection circuit, shown in FIG. 1B.

FIG. 2A shows an internal ESD protection circuit employing transistors, and FIG. 2B shows an external ESD protection circuit employing transistors. That is, instead of the diodes shown in FIGS. 1A and 1B, a diode connection of a PMOS transistor (DPT) and a diode connection of a NMOS transistor (DNT) are used. Here, the DPT replaces the first diode 1 of FIGS. 1A and 1B, and the DNT replaces the second diode 2 of FIGS. 1A and 1B.

The operation of the conventional ESD protection circuit will now be explained. Since the internal ESD protection circuit and the external ESD protection circuit operate similarly, only the operation of the internal ESD protection will be explained. Referring to FIG. 1A, when positive-type static electricity is applied through a pad, the potential at a node A is increased. If the potential at the node A becomes higher than the positive power voltage Vdd by a value equal to the turn-on voltage Von of the first diode 1 due to the applied static electricity, the first diode 1 is turned on. Accordingly, if the potential at node A becomes at least Vdd+Von, the static electricity is by-passed through the first diode 1. Thus, the voltage above Vdd+Von is not transmitted to the internal circuit.

On the other hand, when negative static electricity is applied through the pad, the potential at the node A is decreased. If the potential at node A becomes lower than the negative power voltage Vss by a value equal to the turn-on voltage Von of the second diode 2, the second diode 2 is turned on. Accordingly, if the potential becomes lower than or equal to Vss−Von, the static electricity is by-passed through the second diode 2. Thus, the voltage below Vss−Von is not transmitted to the internal circuit. The ESD protection circuits of FIGS. 2A and 2B employing transistors instead of diodes operate the same way.

The conventional ESD protection circuits have the following problems. If the internal resistor of the diode is destroyed due to an excessive static electricity applied instantaneously, the internal circuit cannot be protected from the static electricity. Thus, the size of the diode or transistor has to be large. This makes the device high-integration and miniaturization impossible.

SUMMARY OF THE INVENTION

Accordingly, the present invention is directed to an ESD protection circuit that substantially obviates one or more of the problems due to limitations and disadvantages of the related art.

An object of the present invention is to provide an ESD protection circuit which distributes static electricity applied to an internal circuit of a device, to thereby prevent a diode and transistor forming the ESD protection circuit from being destroyed. Furthermore, even in case that the diode and transistor are destroyed, the ESD protection circuit by-passes the static electricity at the following stage, to thereby prevent the static electricity from being applied to the internal circuit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the ESD protection circuit of the present invention includes a primary ESD protection circuit consisting of at least one diode, the primary ESD protection circuit being located between positive and negative terminals, and input/output terminals of a semiconductor device, the primary ESD protection circuit bypassing static electricity applied from the input/output terminals; and a secondary ESD protection circuit connected to the primary ESD protection circuit in parallel, the secondary ESD protection circuit consisting of at least one diode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
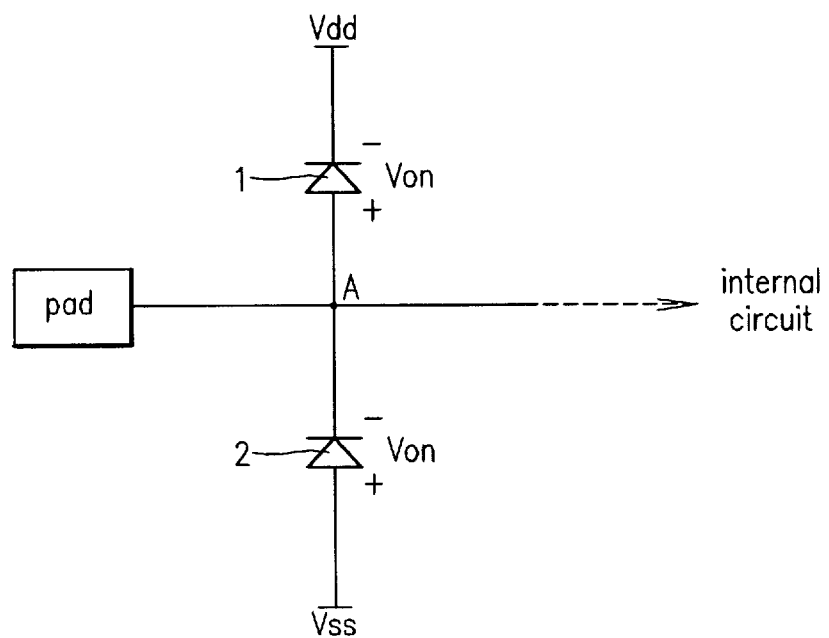
FIG. 1A is a block diagram of an internal ESD protection circuit of a conventional device.
Figure 1B:
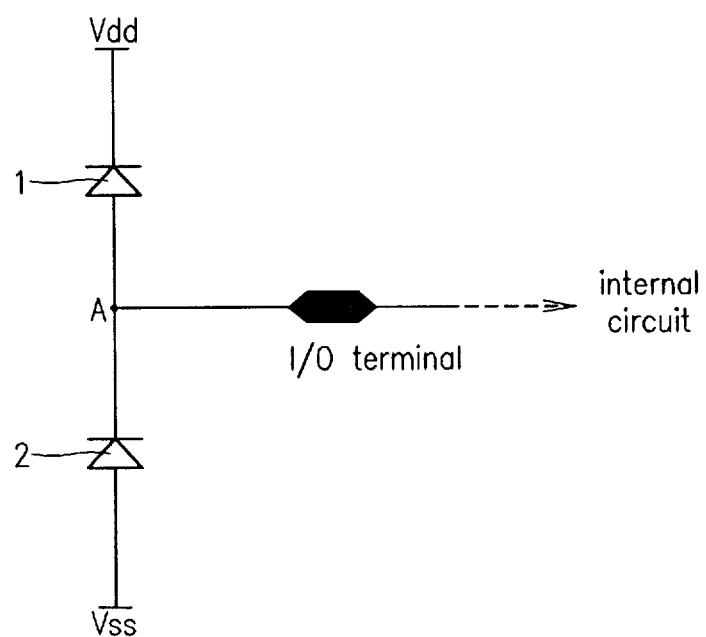
FIG. 1B is a block diagram of an external ESD protection circuit of a conventional device.
Figure 2A:
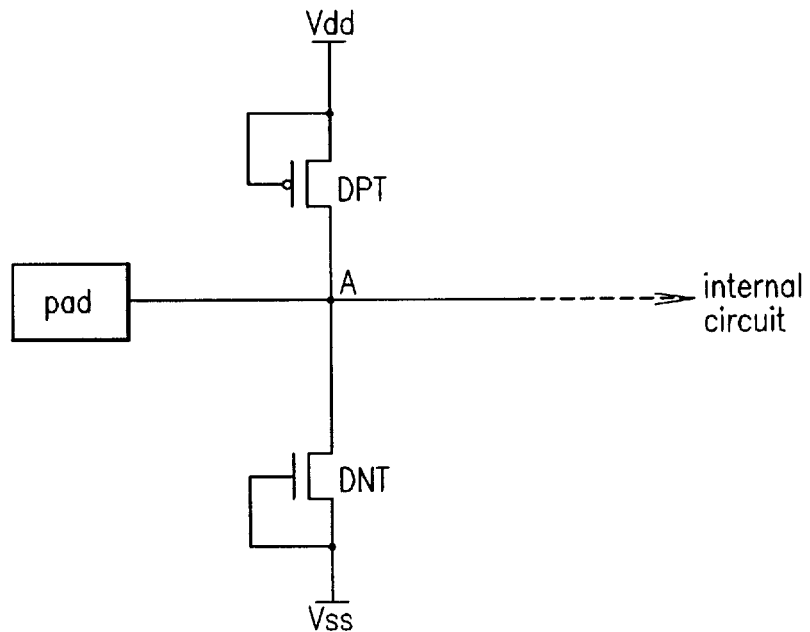
FIG. 2A is a block diagram of an internal ESD protection circuit of another conventional device.
Figure 2B:
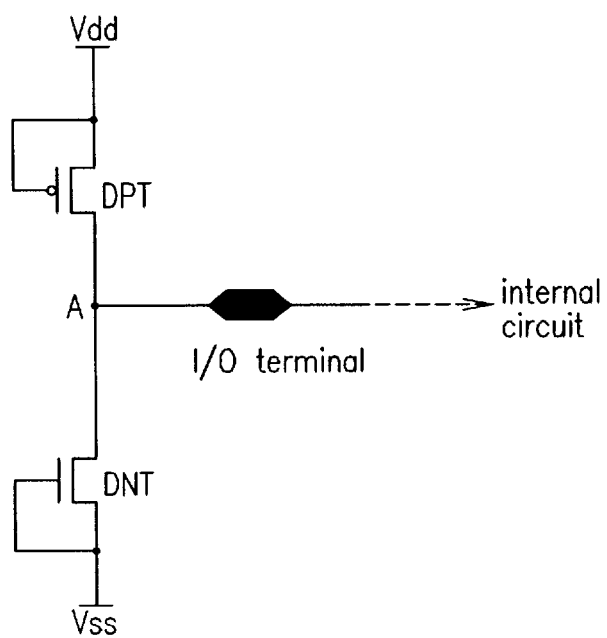
FIG. 2B is a block diagram of an external ESD protection circuit of another conventional device.
Figure 3A:
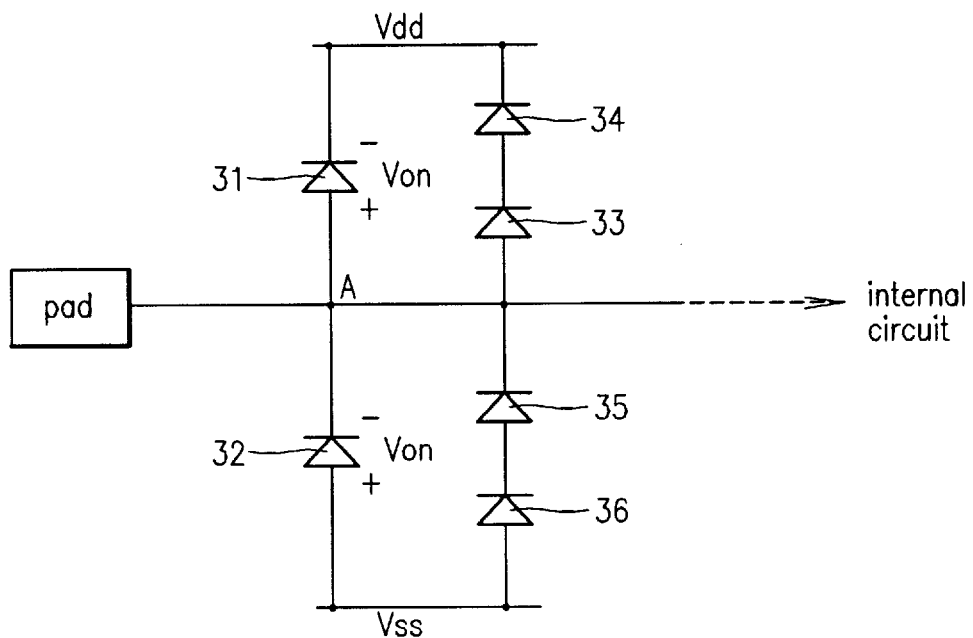
FIG. 3A is a block diagram of an internal ESD protection circuit according to a first embodiment of the present invention.
Figure 3B:
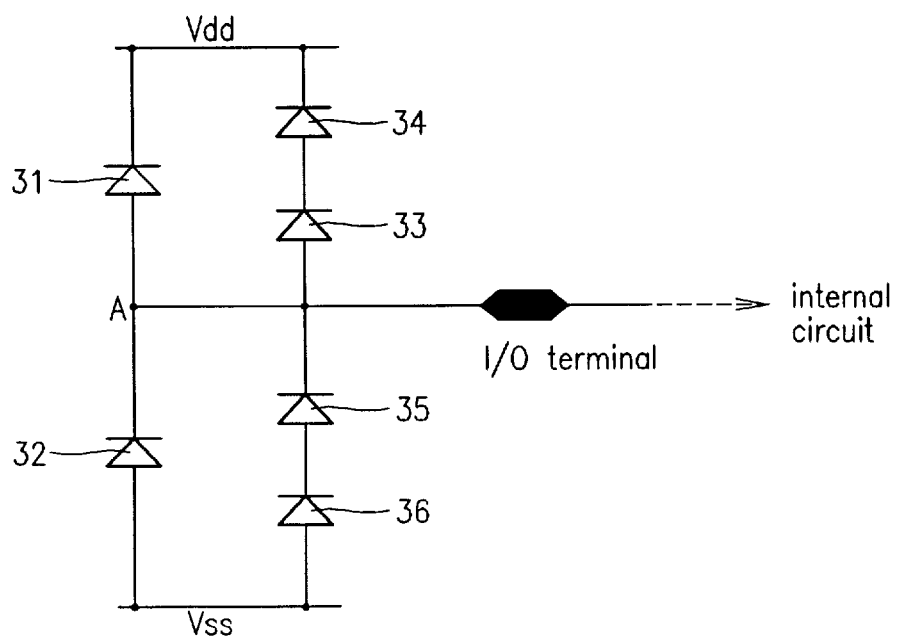
FIG. 3B is a block diagram of an external ESD protection circuit according to the first embodiment of the present invention.

FIG. 3A is a block diagram of an internal ESD protection circuit according to a first embodiment of the present invention, and FIG. 3B is a block diagram of an external ESD protection circuit according to the first embodiment. The internal ESD protection circuit and the external ESD protection circuit have similar structures and operate in a similar fashion. The only difference is whether the ESD protection circuit is located inside a device or outside of a device. Thus, only the internal ESD protection circuit will be described.

Referring to FIG. 3A, the internal ESD protection circuit is formed between the input/output ports and internal circuit of a device. The internal ESD protection circuit includes a first diode 31, a second diode 32, a third diode 33, and a fourth diode 34. The anode of the first diode 31 is connected to a positive power voltage Vdd and its cathode is connected to the input/output ports (or pad) of the internal circuit of the device. The anode of the second diode 32 is connected to the input/output ports of the internal circuit to which the cathode of the first diode 31 is connected to, and the cathode of the second diode 32 is connected to a negative power voltage Vss. The third and fourth diodes 33 and 34 are connected in parallel to the first diode 31 and connected in series between the input/output ports and the positive power voltage Vdd. The fifth and sixth diodes 35 and 36 are connected in parallel to the second diode 32 and connected in series between the input/output ports and the negative power voltage Vss.

Here, the third and fourth diodes 33 and 34 are reverse-biased between the input/output ports and the positive power voltage vdd. The fifth and sixth diodes 35 and 36 are also reverse-biased between the input/output ports and the negative power voltage Vss. Like the third and fourth diodes 33 and 34 connected in parallel to the first diode 31, a plurality of diodes can be connected in parallel to the third and fourth diodes 33 and 34.

The first diode 31 protects the internal circuit from positive static electricity, and the second diode 32 protects the internal circuit from negative static electricity. The first and second diodes 31 and 32 are PN junction diodes. It is also possible to use transistors instead of the diodes.

Figure 4A:
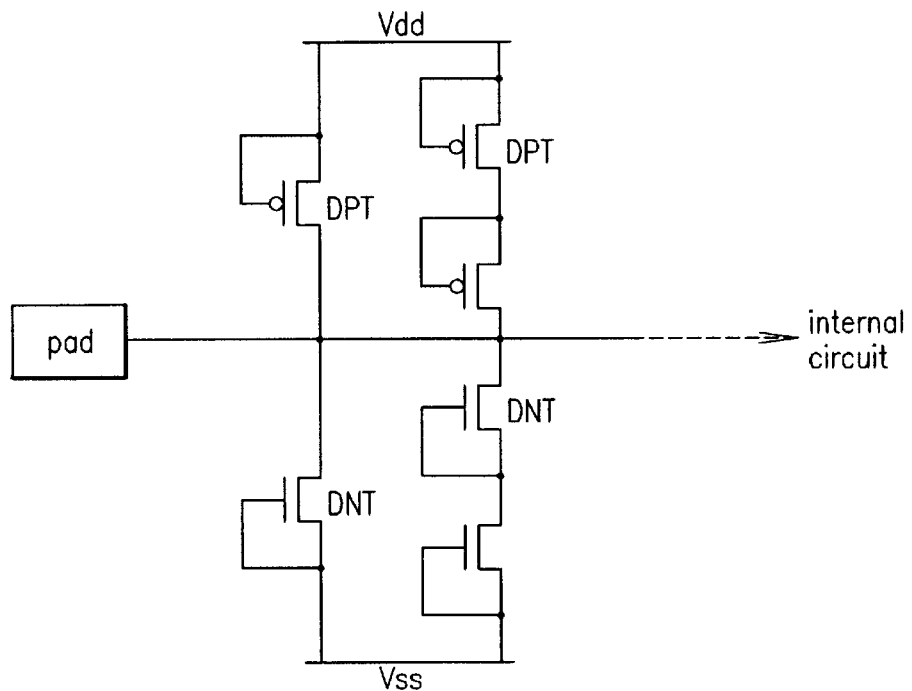
FIG. 4A is a block diagram of an internal ESD protection circuit of a second embodiment of the present invention.
Figure 4B:
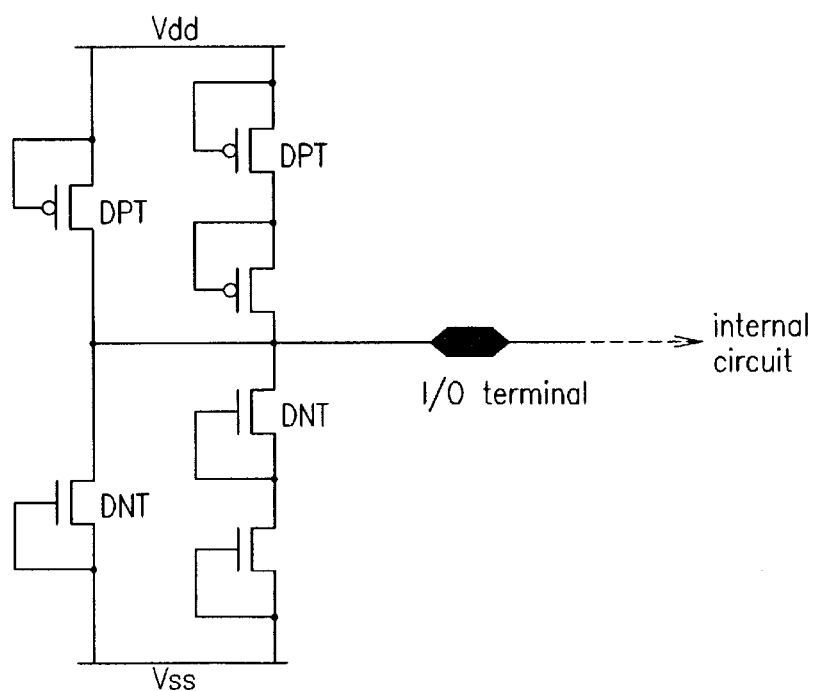
FIG. 4B is a block diagram of an external ESD protection circuit of the second embodiment of the present invention.

FIG. 4A shows an internal ESD protection circuit employing transistors, and FIG. 4B shows an external ESD protection circuit employing transistors. Instead of the diodes shown in FIGS. 3A and 3B, a diode connection of PMOS transistor (DPT) and a diode connection of NMOS transistor (DNT) are used. Here, the DPT replaces the first diode 31 of FIGS. 3A and 3B, and the DNT replaces the second diode 32 of FIGS. 3A and 3B.

The operation of the internal ESD protection circuit of the present invention will now be explained. Referring to FIG. 3A, when a positive static electricity is applied through a pad, the potential at a node A is increased. If the potential at the node A becomes higher than the positive power voltage Vdd by a value equal to a turn-on voltage Von of the first diode 31 due to the applied static electricity, the first diode 31 is turned on. Accordingly, if the potential at the node A becomes at least Vdd+Von, the static electricity is by-passed through the first diode 31.

On the other hand, when negative static electricity is applied through the pad, the potential at the node A is decreased. If the potential at the node A becomes lower than the negative power voltage Vss by a value equal to the turn-on voltage Von of the second diode 32, the second diode 32 is turned on. Accordingly, if the potential becomes lower than or equal to Vss−Von, the static electricity is by-passed through the second diode 32. By doing so, the internal circuit is protected from the static electricity.

However, if the applied positive static electricity is excessive, the current flowing through the first diode 31 is increased. Thus, the potential of the node A becomes higher than Vdd+Von. Here, a small amount of leakage current flows through the third and fourth diodes 33 and 34. This leakage current is proportional to the potential at the node A. Accordingly, the current distribution through the first, third and fourth diodes 31, 33 and 34 prevents the first diode 31 from being destroyed due to excessive static electricity.

If excessive negative static electricity is applied, the second diode 32 can be prevented from being destroyed through the current distribution through the second, fifth and sixth diodes 32, 35 and 36. Even if the first or second diode is destroyed due to the excessive positive or negative static electricity, the third and fourth diodes 33 and 34, or the fifth and sixth diodes 35 and 36, replace the first and second diodes 31 and 32.

The present invention has the following advantages. The diodes or transistors forming the ESD protection circuit are constructed in multiple stages, to thereby distribute any excessive static electricity applied to the ESD circuit. By doing so, the ESD protection circuit is prevented from being destroyed. Furthermore, even when the first stage of the ESD protection circuit is destroyed, the following stage can replace it. Accordingly, the static electricity will not be applied to the internal circuit.

It will be apparent to those skilled in the art that various modifications and variations can be made in the ESD protection circuit of the present invention without departing from the spirit or scope of the invention. Thus, it is intended that the present invention cover the modifications and variations of this invention provided they come within the scope of the appended claims and their equivalents.

What is claimed is:

1. An ESD protection circuit for a semiconductor device comprising:

a primary ESD protection circuit including at least two diodes, the primary ESD protection circuit being located between a positive voltage and a negative voltage, and connected to input/output terminals of the semiconductor device, the primary ESD protection circuit bypassing static electricity applied from the input/output terminals; and a secondary ESD protection circuit connected to the primary ESD protection circuit in parallel, the secondary ESD protection circuit including at least two diodes in series between the positive voltage and the input/output terminals and between the negative voltage and the input/output terminals, respectively.

2. The ESD protection circuit as claimed in claim 1, wherein the secondary ESD protection circuit divides and bypasses the static electricity together with the primary ESD protection circuit.

3. The ESD protection circuit as claimed in claim 1, further comprising a third ESD protection circuit connected to the secondary ESD protection circuit in parallel.

4. The ESD protection circuit as claimed in claim 1, further comprising a plurality of ESD protection circuits connected to the second ESD protection circuit in parallel.

5. The ESD protection circuit as claimed in claim 1, wherein the primary and secondary ESD protection circuits are formed outside of the semiconductor device.

6. The ESD protection circuit as claimed in claimed 1, wherein the primary and secondary ESD protection circuits are formed inside of the semiconductor device.

7. The ESD protection circuit as claimed in claim 1, wherein each of the at least two diodes in the primary ESD protection circuit and the secondary ESD protection circuit is reverse-biased between the input/output terminals and either the positive voltage or the negative voltage.

8. The ESD protection circuit as claimed in claim 1, wherein the at least two diodes in the primary ESD protection circuit are connected in series and the at least two diodes in the secondary ESD protection circuit are connected in series.

9. An ESD protection circuit for a semiconductor device, comprising:

a primary ESD protection circuit located between a positive voltage and a negative voltage, and connected to input/output terminals of the semiconductor device, the primary ESD protection circuit bypassing static electricity applied from the input/output terminals; and a secondary ESD protection circuit connected to the primary ESD protection circuit in parallel for bypassing the static electricity, if the static electricity exceeds a predetermined amount.

10. The ESD protection circuit as claimed in claim 9, wherein the secondary ESD protection circuit includes at least two diodes connected in series.

11. The ESD protection circuit as claimed as in claim 9, wherein the primary ESD protection circuit and the secondary ESD protection circuit are formed inside the semiconductor device.

12. The ESD protection circuit as claimed in claim 9, wherein the primary ESD protection circuit and the secondary ESD protection circuit are formed outside of the semiconductor device.

13. The ESD protection circuit as claimed in claim 9, wherein the primary ESD protection circuit includes two diodes connected in series.

14. The ESD protection circuit as claimed in claim 13, wherein the diodes are PN junction diodes.

15. The ESD protection circuit as claimed in claim 9, wherein the primary ESD protection circuit includes a first transistor and a second transistor connected in series.

16. The ESD protection circuit as claimed in claim 15, wherein the first transistor includes a PMOS transistor with a diode connection, and the second transistor includes a NMOS transistor with a diode connection.

17. The ESD protection circuit as claimed in claim 9, wherein the secondary ESD protection circuit includes at least two transistors connected in series.

18. The ESD protection circuit as claimed in claim 17, wherein one of the at least two transistors is a PMOS transistor with a diode connection, and one of the at least two transistors is a NMOS transistor with a diode connection.

* * * * *